Feb. 6, 1945.                R. J. SHERMAN                2,368,786
                       MATERIAL WORKING APPARATUS
                         Filed Aug. 29, 1941
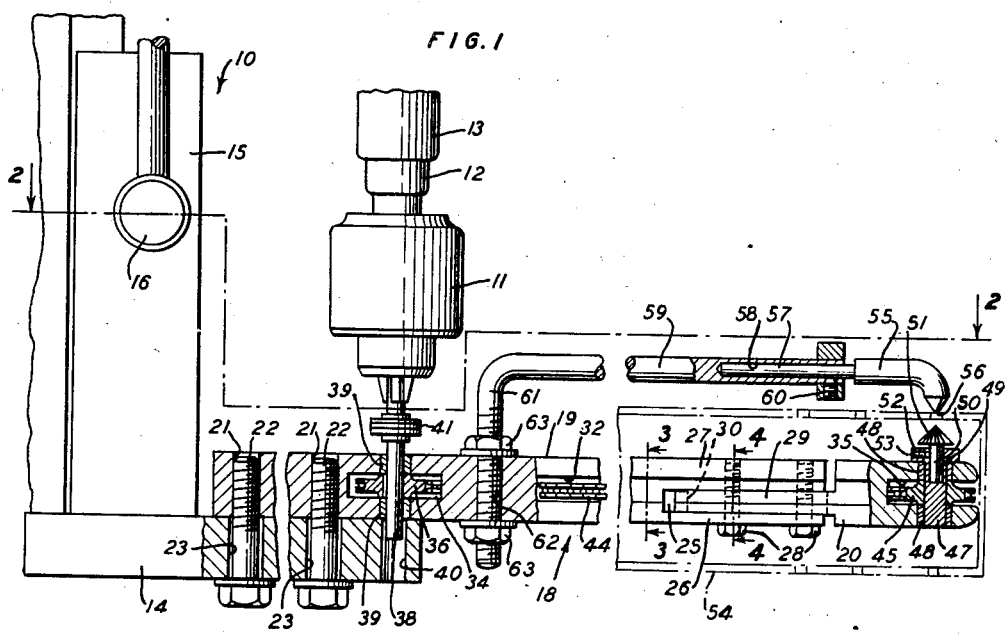
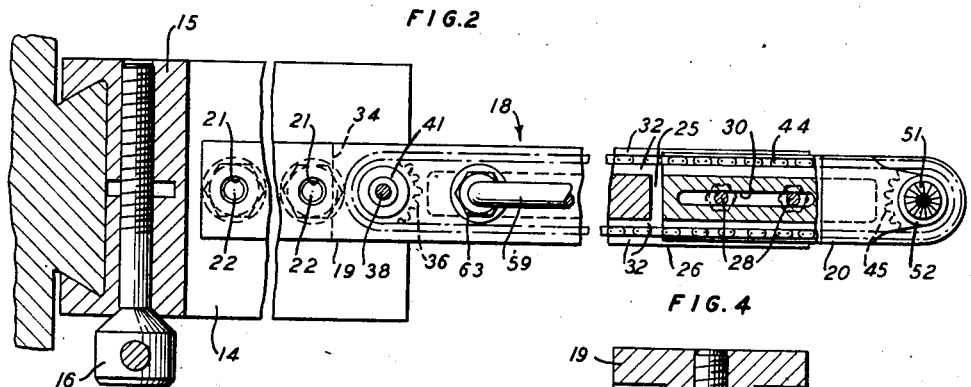
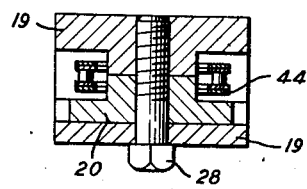
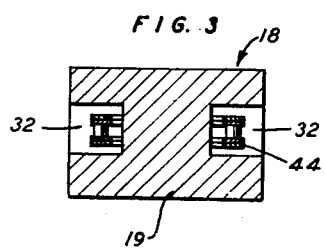
INVENTOR
R. J. SHERMAN
BY E. R. Nowlan
ATTORNEY Patented Feb. 6, 1945

2,368,786

UNITED STATES PATENT OFFICE 2,368,786

MATERIAL WORKING APPARATUS

Russel J. Sherman, Rutherford, N. J., assignor to Western Electric Company, Incorporated, New York, N. Y., a corporation of New York Application August 29, 1941, Serial No. 408,706

9 Claims. (Cl. 77—55)

This invention relates to material working apparatus, and more particularly to tool attachments for drill presses.

Conventional tool holders such as chucks of drill presses, lathes or the like are usually made fairly large to incorporate durable tool gripping mechanism therein, and for this reason it has been found impossible to use such structures for work within small containers or the like.

An object of the invention is to provide a material working apparatus, particularly an attachment for a power driven machine, to condition the machine to perform work in restricted areas on materials.

With this and other objects in view, the invention comprises a material working apparatus in combination with a driving unit, the apparatus comprising an arm supporting a tool attachment at one end and a connection with a driven unit at the other end, the connection and the attachment being operatively connected to each other so that the tool may be driven by the unit; an indicator element positioned with a point thereof in alignment with the tool facilitating in aligning the tool with a point of the material to be worked.

Other objects and advantages will be apparent from the following detailed description taken in conjunction with the accompanying drawing, wherein Fig. 1 is a side elevational view of the apparatus shown attached to a drill press, portions of the apparatus being shown in section;

Fig. 2 is a top plan view of the apparatus, this view being taken substantially along the line 2—2 of Fig. 1;

Fig. 3 is a vertical sectional view taken along the line 3—3 of Fig. 1, and

Fig. 4 is a vertical sectional view taken along the line 4—4 of Fig. 1.

Attention is now directed to the drawing, wherein numeral 10 designates a material working machine of any suitable type, that illustrated for the purpose of the invention being a drill press. The machine 10 has a driving unit 11, which in the present instance is a tool supporting chuck driven by a spindle 12 rotatably supported at 13 in the conventional manner. The details of the chuck are not set forth, as the structure, operation and purpose thereof are well known. The machine 10 also has a table 14 carried by a saddle 15 or other suitable means adjustable vertically and held in any desired position by a screw 16.

The apparatus comprises an arm indicated generally at 18 and composed of two parts, namely a main or supporting part 19 and an adjustable end 20. The part 19 of the arm has threaded apertures 21 to receive screws 22 passing through apertures 23 in the table 14 to rigidly secure the arm to the table. The parts 19 and 20 of the arm 18 are provided with an interfitting variable connection as illustrated in Figs. 1, 2 and 4, the part 19 having a slot 25 therein resulting in a relatively thin or resilient wall portion 26 and a relatively thick wall portion 27. In these wall portions sets of aligned apertures are formed, the apertures in the portion 27 being threaded to receive the threaded ends of screws 28. The part 20 of the arm has a reduced portion 29 receivable in the slot 25, this portion also having an elongate aperture 30 therein through which the screws 28 pass to allow aligned adjustment of the parts of the arm, the screws 28 cooperating with the wall portions 26 and 27 to secure the parts of the arm in any desired position.

The arm 18 including both parts 19 and 20, has longitudinal grooves 32 at both sides thereof parallel with each other and terminating at apertures 34 and 35. The aperture 34 extends the full width of the arm, communicating with both longitudinal grooves 32, and has a sprocket wheel 36 disposed therein. A spindle 38 extends through the sprocket wheel 36 and is fixed thereto by any suitable means such as a key and keyway. Suitable bearings 39 are formed in the arm upon both sides of the sprocket wheel, to rotatably support the spindle 38. As will be observed by viewing Fig. 1, an aperture 40 in the table 14 permits the spindle 38 to project downwardly therein. This aperture 40 is to receive either end of the spindle, as the apparatus is formed so that it may be used either in the position shown or in a reverse position, as will hereinafter be described. A flexible coupling 41 of the conventional type is disposed upon the spindle 38 and serves to operatively connect the spindle with the driving unit or chuck 11. In other words, the flexible coupling may have two metallic portions joined by a resilient portion, one metallic portion being connected to the spindle while the other metallic portion has a spindle or pin-like connection serving for connection with the jaws of the chuck or driving unit.

A chain 44 operatively connects the sprocket wheel 36 with a sprocket wheel 45, the chain passing through the grooves 32 in the sides of the arm 18. The chain 44 is composed of a plurality of connected links which may be varied in number to compensate for variations in the length of the arm 18. The sprocket wheel 45 is disposed in the recess or aperture 35 in the end of the arm 18 and mounted upon a shaft 47. The shaft 47 is journalled in suitable bearings 48 in the arm 18 and has one end provided with a central aperture 49 for a portion of its length to receive a shank 50 of a tool 51. The tool 51 is one of various types which may be employed, this being a burring or countersinking tool. The outer end of the shaft 47 is enlarged, as at 52, to accommodate a set screw 53 serving to rigidly secure the tool in the shaft.

Attention is directed to the fact that the tool 51, together with its supporting and driving means, is mounted adjacent the end of the arm 18 and that this structure, including the tool and the supporting end of the arm, is small in comparison to the conventional chuck 11. It is, therefore, possible for the tool to perform operations in restricted areas such as within small containers 54 even where the tool may be hidden from view of the apparatus.

To assist the operator in positioning the material accurately with respect to the tool, an indicating element 55 has a point 56 which may be disposed in alignment with the axis of the tool to identify the location of the tool when the tool is hidden from the view of the operator. The element 55 is of the general contour illustrated in Fig. 1, provided with a reduced shank portion 57 receivable in an aperture 58 of a support 59, a set screw 60 serving to lock the element in a desired position within the support. The support 59 extends rearwardly from the end of the arm 18 supporting the tool, so that material of various widths or lengths may be disposed relative to the tool without interference from the support. The rearward end of the support 59 is bent at right angles, as at 61, this portion being threaded and extending through an aperture 62 of the portion 19 of the arm, nuts and washers 63 being provided upon opposite sides of the arm to secure the support 59 in any desired position relative to the arm.

The operation of the apparatus is as follows: With the apparatus operatively connected to the driving unit 11, as shown in Fig. 1, rotation of the driving unit will cause rotation of the spindle 38, through the flexible coupling 41 to drive the sprocket wheel 36, the latter driving the sprocket wheel 45 through the chain 44. The sprocket wheel 45, through its shaft 47, will drive the tool 51 in the same direction that the driving unit 11 is rotated. Let it be assumed that the metal container 54 has a plurality of holes therein, these holes having been drilled in the walls of the container, leaving burrs on their edges within the container which must be removed. If the container has an open end it may be positioned over the end of the arm 18 so that a selected outer surface thereof will ride beneath the element 55 until the point 56 has registered with one of the holes. This action, the registration of a hole with the point of the element, assures the operator that the hole is in direct alignment with the tool. Therefore, by lowering the container, the hole therein will be accurately moved into engagement with the driven tool, resulting in the removal of the burrs from the edge of the hole. This operation may be repeated, the element 55 serving to accurately align the successive holes in the container with the tool, eliminating the necessity of guesswork on the part of the operator and the obvious resulting damage to the material.

It is also possible for the tool to perform work within tubular structures or other restricted areas, either through the assistance of the indicating element 55 when the tool is hidden from view or without the element when it is possible for the operator to see the portion of the material which is desirable to be brought into engagement with the tool. Furthermore, the apparatus may be disposed in a reverse position from that illustrated, by removing first the screws 22, disconnecting then the unit 11 and the coupling 14, raising the unit in the conventional manner so that the apparatus may be reversed, and again forming connection of the unit and coupling with the spindle 38 after the arm has been mounted in place through the aid of the screws 22. This positions the tool 51 in a downwardly projecting position where, aided by the element 55 or without its assistance, depending upon the type of work to be performed, the tool may again be put in operation.

The invention, therefore, comprises an apparatus which may be driven by suitable means, the present means selected for this purpose being a drill press wherein the driving force of the chuck is utilized to drive the tool. The apparatus serves as a means to extend power from a unit incapable of performing various functions, to a strcuture of restricted size including a material working tool capable of performing various operations within restricted areas which heretofore have not been capable of being performed by machine. Furthermore, when the restricted areas are such that they are hidden from the operator's view, the element 55 functions to assure the operator of the accurate location of each portion of the work where an operation is to be performed and to remove all danger of damage to the work resulting from the need of the operator guessing the relationship of the tool and the portions of the material where operations are to be performed.

The embodiment of the invention herein disclosed is merely illustrative and may be widely modified and departed from in many ways without departing from the spirit and scope of the invention as pointed out in and limited solely by the appended claims.

What is claimed is:

1. A material working apparatus in combination with a driving unit, the apparatus comprising an arm, rotatable elements mounted at spaced positions in the arm, means to operatively connect one of the elements to the driving unit, a tool, means to operatively connect the tool to the other element, a flexible member operatively connecting the elements to cause driving of the tool upon operation of the driving unit, and an indicating pointer mounted to point to the tool to indicate the location of the tool relative to material.

2. A material working apparatus in combination with a driving chuck, the apparatus comprising a tool, means to support the tool at a position spaced from the chuck, means operatively connecting the tool to the chuck, and a pointer positioned to point to the tool to indicate the location of the tool relative to material to be worked on by the tool.

3. A material working apparatus in combination with a driving chuck, the apparatus comprising a tool, means to support the tool at a position spaced from the chuck, means operatively connecting the tool to the chuck, and a pointer positioned to point to the tool to indicate the location of the center of the tool relative to material to be worked on by the tool.

4. A material working apparatus in combination with a driving unit, the apparatus comprising a tool, means to support the tool at a position spaced from the unit, means operatively connecting the tool to the unit, and a pointer positioned to point to the tool to indicate the location of the axis of the tool and the direction of the axis relative to material to be worked on by the tool.

5. A material working apparatus in combination with a driving unit, the apparatus comprising an arm having grooves therein, rotatable elements mounted at spaced positions in the arm, means to operatively connect one of the elements to the driving unit, a tool, means to operatively connect the tool to the other element, a chain housed in the said grooves and operatively connecting the elements to cause driving of the tool upon operation of the driving unit, and an element indicating the location of the tool relative to material to be worked on by the tool.

6. A material working apparatus in combination with a driving unit, the apparatus comprising a tool, means to support the tool at variable distances from the unit, means operatively connecting the tool to the unit, and a pointer variable in location with variations in the positioning of the tool to point to the tool to indicate the location of the tool relative to material to be worked by the tool.

7. A material working apparatus in combination with a drill press having a driving chuck and a table, an arm, means to secure the arm to the table, rotatable elements mounted at spaced positions in the arm, means to operatively connect one of the elements to the chuck, a tool, means to operatively connect the tool to the other element, and a flexible member operatively connecting the elements to cause driving of the tool upon operation of the driving unit, the said securing means for the arm and the connecting means for the chuck and its respective rotary element being adapted for reversal of the position of the arm and the tool.

8. A material working apparatus comprising an elongate arm, means to support the arm, a driving means adjacent one end of the arm, a driven means adjacent the other end of the arm, means to operatively connect the driving and driven means, a material working tool secured to the driven means and driven about its axis thereby, and a member positioned to point to the axis of the tool to indicate the location thereof when the tool is hidden from view by material to be worked.

9. A material working apparatus comprising an elongate arm, means to support the arm, a driving means adjacent one end of the arm, a driven means adjacent the other end of the arm, means to operatively connect the driving and driven means, a material working tool secured to the driven means and driven about its axis thereby, a member positioned to point to the axis of the tool to indicate the location thereof when the tool is hidden from view by material to be worked, means by the aid of which the arm may be varied in length, and means to support the said pointing member for variation in position with the tool during variation in the length of the arm.

RUSSEL J. SHERMAN.